US006425550B1

United States Patent
Gayowski et al.

(10) Patent No.: US 6,425,550 B1
(45) Date of Patent: Jul. 30, 2002

(54) CARRIER TAPE REEL ASSEMBLY

(75) Inventors: Edward W. Gayowski, Colleyville; Douglas J. Sharp, Arlington, both of TX (US); John F. Nelson, Marco Island, FL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/537,008

(22) Filed: Mar. 28, 2000

(51) Int. Cl.[7] .............................................. B65H 75/14
(52) U.S. Cl. ............................... 242/608.6; 242/608.5; 242/608.2
(58) Field of Search ........................... 242/608.6, 608.5, 242/608.2

(56) References Cited

U.S. PATENT DOCUMENTS

| | | | |
|---|---|---|---|
| 1,819,337 A | | 8/1931 | Pevear |
| 2,494,612 A | | 1/1950 | Goldberg |
| 3,041,005 A | * | 6/1962 | Wallace ....................... 242/116 |
| 3,143,313 A | * | 8/1964 | Purzycki .................... 242/71.8 |
| 4,002,309 A | * | 1/1977 | Ruiz-Barbotteau ......... 242/71.8 |
| 4,226,381 A | | 10/1980 | Katata |
| 4,515,323 A | * | 5/1985 | Rood et al. ................. 242/74.1 |
| 4,629,136 A | * | 12/1986 | Vallance .................... 242/71.8 |
| 4,671,409 A | * | 6/1987 | Espy .......................... 206/397 |
| 4,702,429 A | * | 10/1987 | Black ......................... 242/71.8 |
| 4,726,534 A | * | 2/1988 | Chenoweth ................. 242/71.9 |
| 4,867,391 A | * | 9/1989 | Resch ....................... 242/118.5 |
| 5,524,850 A | | 6/1996 | Liao |
| 5,531,399 A | * | 7/1996 | Weisburn et al. ......... 242/608.6 |
| 5,779,186 A | * | 7/1998 | Bakker et al. ............ 242/609.1 |
| 5,941,477 A | | 8/1999 | Basili et al. |
| 6,045,087 A | * | 4/2000 | Vislocky et al. ......... 242/608.6 |

* cited by examiner

Primary Examiner—Donald P. Walsh
Assistant Examiner—Joseph Rodriguez
(74) Attorney, Agent, or Firm—Pitney, Hardin, Kipp & Szuch LLP

(57) ABSTRACT

The apparatus is a carrier tape reel assembly formed of two reel halves. The reel halves include hub portions which further include male detent elements which are rotationally symmetric with each other and likewise include female detent elements which are rotationally symmetric with each other. The male and female detent elements, however, include rotationally asymmetric elements to assure that the two halves are properly aligned so that the open tape slots of the two reel halves are properly aligned. The male and female detent elements are further engaged by a longitudinal motion, without the need for rotational movement during engagement. Stacking apertures are formed rotationally midway between adjacent detent elements to permit the stacking of reel halves, whereby the reel halves are facing in the same direction, but are rotated so that the male detent elements pass through the stacking apertures free of detent engagement.

9 Claims, 6 Drawing Sheets

CARRIER TAPE REEL ASSEMBLY

BACKGROUND OF THE INVENTION

1. Field of the Invention

The invention pertains to a carrier tape reel assembly which includes two reel halves with detent locks. The two reel halves can be disassembled and stacked in a compact configuration.

2. Description of the Prior Art

In the prior art, it is known to use a two-piece reel for the storing and shipping of flexible sheet media. The flexible sheet material can be film, tape, or elongated ribbons. The flexible sheet material can likewise be laminated sheet material for packaging a plurality of parts, electrical components, and the like, as described in U.S. Pat. No. 4,726,534 entitled "Convertible Reel Assembly" issued on Feb. 23, 1988 to Chenoweth. This reference uses inner and outer circles of interengaging ears along with a circle of locks which have interengaging lips which prevent reverse or backward rotation of the reel sections thereby maintaining the interlocking ears of the reel section in holding relationship with each other. However, the rotational movement required for assembly is inconvenient and may result in a strength of connection which is less than satisfactory. Additionally, this reference does not appear to provide any mechanism to assure alignment of the open tape slots between the two reel portions.

Reel Services manufactures a reel which includes reel halves with detent elements which are assembled with a longitudinal motion. However, the detent elements are not positioned rotationally symmetrically. That is, the two male detent elements on a reel half are separated from each other by ninety degrees. Likewise, the two female detent elements are separated from each other by ninety degrees.

Other prior art references have similar deficiencies such as complicated assembly procedures with rotational movements, rotational engagements which may not be adequately secure against inadvertent disengagement or may be difficult to separate when desired. Similarly, some prior art references may not provide for simple stacking and shipping of the reel halves prior to assembly. Moreover, some prior art references may have complicated designs or protrusions in the locking mechanisms which are easily damaged.

Some prior references include U.S. Pat. No. 5,941,477 entitled "Virtually Fully Engagable Stacking Reel Component" issued on Aug. 24, 1999 to Basili et al.; U.S. Pat. No. 5,779,186 entitled "Multi-Part Reel for Electrical Terminals and the Like" issued on Jul. 14, 1998 to Bakker et al.; U.S. Pat. No. 5,531,399 entitled "Tape Reel" issued on Jul. 2,1996 to Weisburn et al.; U.S. Pat. No. 5,524,850 entitled "Carrier Tape Reel Assembly" issued on Jun. 11, 1996 to Liao; U.S. Pat. No. 4,226,381 entitled "Tape Reel" issued on Oct. 7, 1980 to Katata; U.S. Pat. No. 4,002,309 entitled "Bobbin for Cinematographic Films" issued on Jan. 11, 1977 to Ruiz-Barbotteau; U.S. Pat. No. 2,494,612 entitled "Separable Moving Picture Film Reel" issued on Oct. 31, 1947 to Goldberg et al.; and U.S. Pat. No. 1,819,337 entitled "Reel" issued on Aug. 18, 1931 to Pevear.

OBJECTS AND SUMMARY OF THE INVENTION

It is therefore an object of the present invention to provide a tape reel assembly with reel halves which can be assembled quickly and easily.

It is therefore a further object of the present invention to provide a tape reel assembly with reel halves which are secure against relative rotation after assembly, but which can be easily disassembled when desired.

It is therefore a still further object of the present assembly to provide a tape reel assembly with reel halves which include structure to assure alignment of the open tape slots of the reel halves.

It is therefore a still further object of the present invention to provide a tape reel assembly with two reel halves with engagement structure which is not susceptible to damage.

It is therefore a still further object of the present invention to provide a tape reel assembly with reel halves which can be stacked easily for storage and shipment prior to assembly.

It is therefore a still further object of the present invention to provide a tape reel assembly with reel halves which can accommodate a number of different widths of media by varying the total thickness of the hub formed by the two reel halves.

It is therefore a still further object of the present invention to provide a tape reel assembly with reel halves wherein the detent elements of like gender are placed rotationally symmetrically with respect to each other.

It is therefore a still further object of the present invention to provide a tape reel assembly with a simple design, which is economical to manufacture.

These and other objects are attained by providing a tape reel assembly comprised of two halves. Each half is substantially identical to the other, although halves with different hub thicknesses can be joined to vary the resulting hub thickness for different widths of media. The halves each include two longitudinally oriented male detent elements which are opposed 180 degrees apart from each other. Similarly, two longitudinally oriented female detent elements are opposed 180 degrees apart from each other and 90 degrees apart from each male detent element. While the detent elements are positioned rotationally symmetrically about the reel halves, the male detent elements themselves include rotationally asymmetric ridges which align with rotationally asymmetric grooves in the female detent elements to assure that the open tape slots of the two reel halves are properly aligned. The longitudinal orientation of the detent elements provides for the reel halves to be secured to each other by a single straight-line motion of the reel halves without need for rotation during attachment. Moreover, the longitudinal orientation of these elements eliminates any reasonable possibility of relative rotation of the reel halves after proper engagement.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
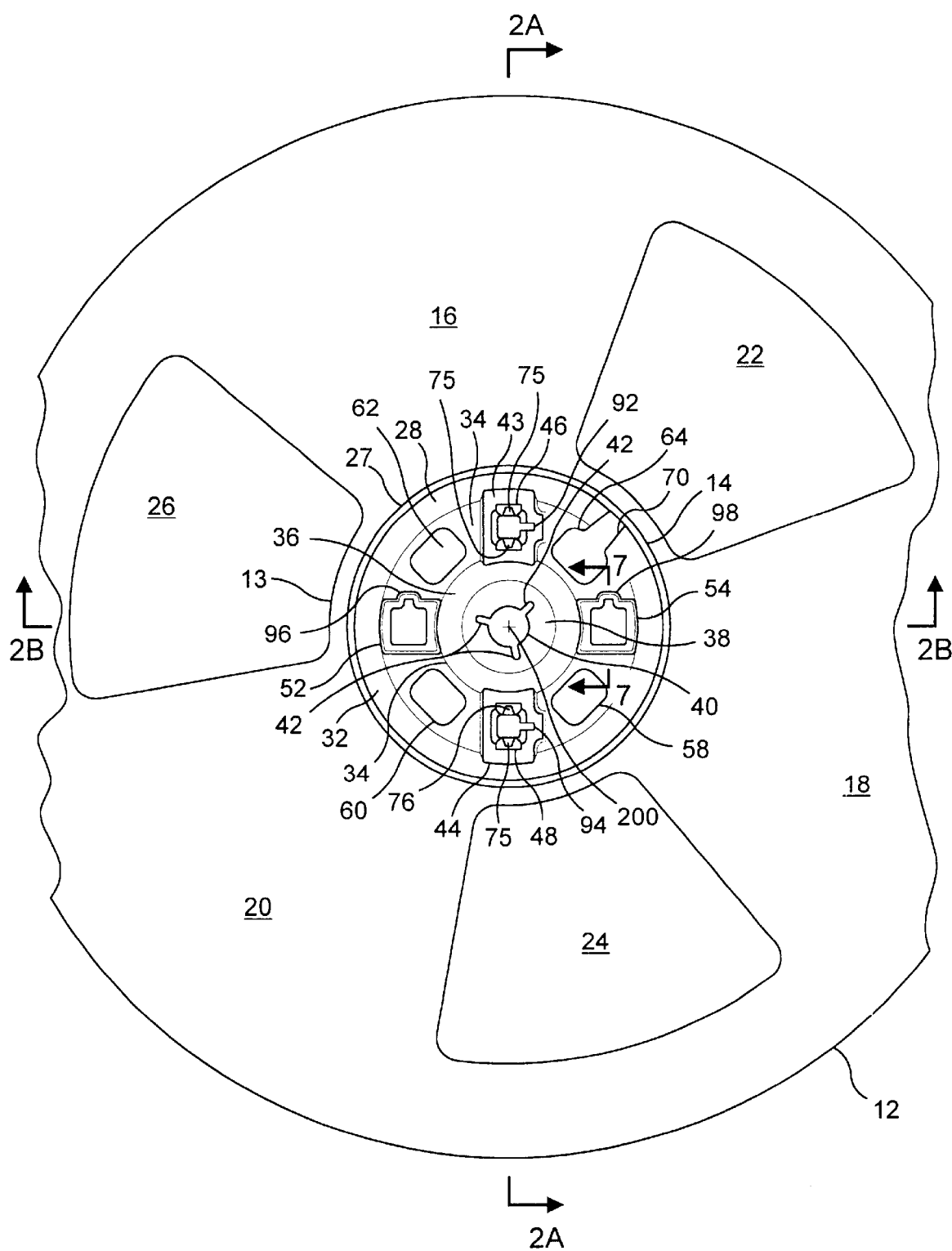
FIG. 1 is a side plan view of a reel half of the tape reel assembly of the present invention.
Figure 2:
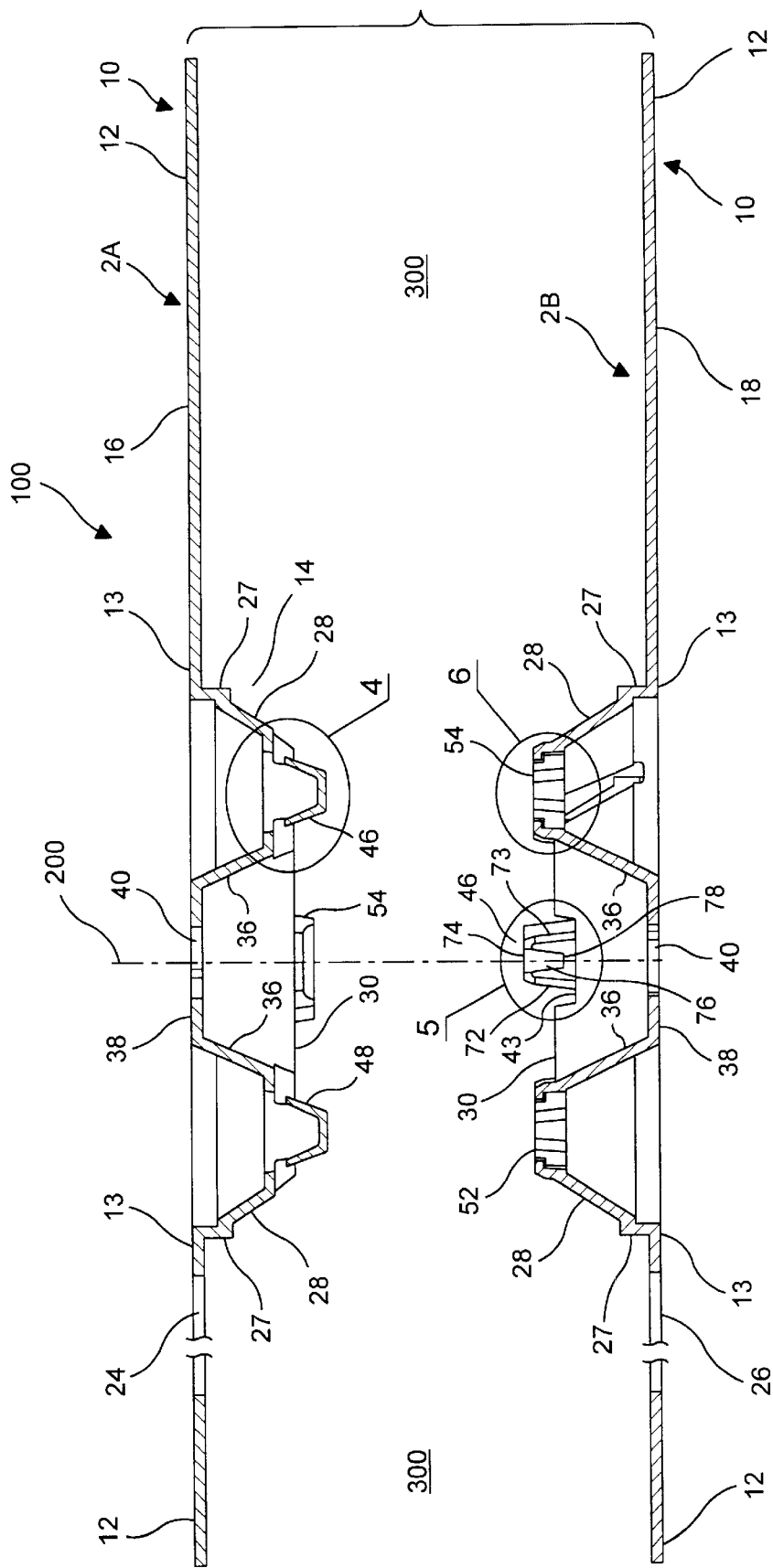
FIG. 2 is an exploded cross-sectional view showing how the male detent elements along plane 2A—2A of a reel half of FIG. 1 are assembled with the female detent elements along plane 2B—2B of FIG. 1, of an identical reel half, rotated 90 degrees.
Figure 3:
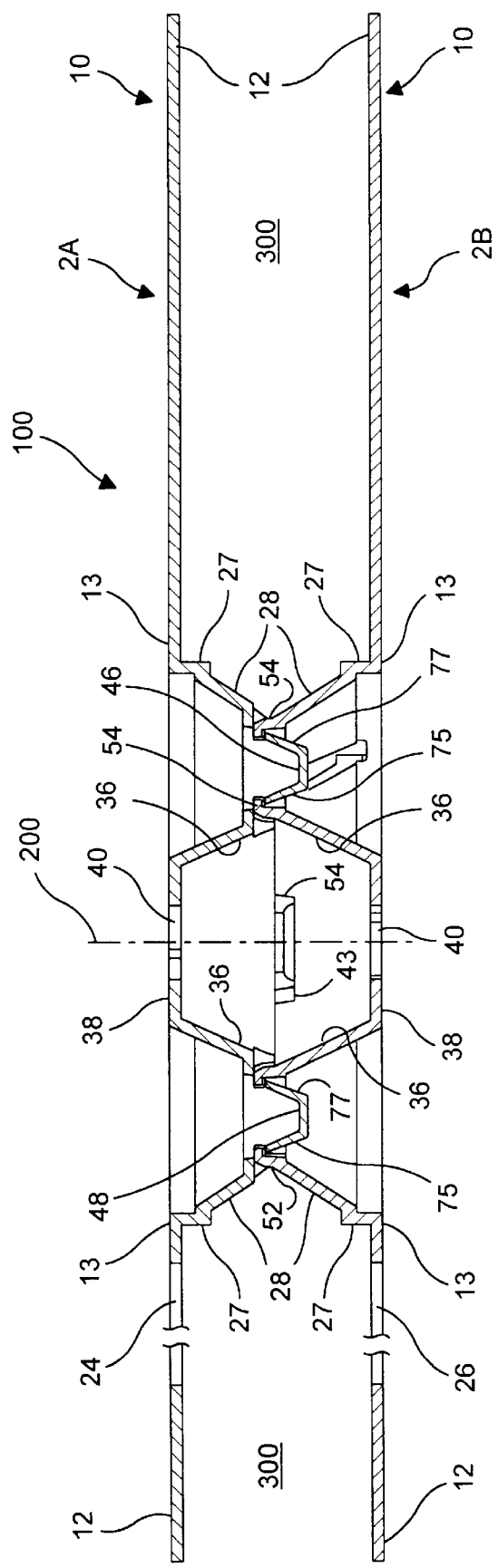
FIG. 3 is a cross-sectional view showing the assembly of the two reel halves of FIG. 2.

Referring now to the drawings in detail wherein like numerals refer to like elements throughout the several views, one sees that FIG. 1 is a plan view of a reel half 10 of the present invention. Two reel halves 10 are assembled to create tape reel assembly 100 as shown in FIGS. 2 and 3 as will be described hereinafter.

Reel half 10 includes outer circular rim 12 and inner circular rim 13 which is joined to hub section 14. Outer circular rim 12 is joined to inner circular rim 13 by three radially extending spokes 16, 18, 20 which are formed as arcuate sections of a circle. Open arcuate spaces 22, 24, 26 are formed circumferentially between spokes 16, 18, 20. Spokes 16, 18, 20 and outer circular rim 12 form the walls which, in turn, form the space 300 (see FIGS. 2 and 3) within which the flexible sheet material is held after being wound around hub section 14. Hub section 14 is formed about rotational axis 200.

Hub section 14 includes longitudinally inwardly extending lip 27 which forms the outer portion of a hub about which the flexible sheet media is wrapped. Frustro-conical wall 28 extends further inwardly from longitudinally inwardly extending lip 27. If a hub is desired which is parallel to rotational axis 200, then frustro-conical walls 28 can be replaced with cylindrical walls parallel to rotational axis 200, as an extension from lip 27. Frustro-conical walls 28 of two reel halves form the spacing of the hub about which the flexible sheet media is wrapped. In fact, otherwise identical reel halves 10 which include different longitudinal depths of frustro-conical wall 28 can be joined in order to provide variations in the width of space 300, thereby allowing the resulting reel 100 to accommodate different widths of flexible sheet material.

Toroidal planar surface 30 has an outer circumference 32 and an inner circumference 34 (see FIG. 1). Outer circumference 32 is supported by frustro-conical wall 28 while inner circumference 34 is supported by inverse frustro-conical wall 36 which, in turn, joins radially inward planar support section 38 which is formed around aperture 40 formed about rotational axis 200 which provides the axis of rotation for reel 100. As shown in FIG. 1, aperture 40 typically includes three circumferentially spaced radially extending grooves 42 for securing reel 100 to a drive spindle (not shown).

Two male detent elements 46, 48 are formed on recessed surfaces 43, 44, respectively, on toroidal planar surface 30 and are symmetrically oriented 180 degrees from each other. Likewise, two female detent elements 52, 54 are formed on toroidal planar surface 30 and are symmetrically oriented 180 degrees from each other and 90 degrees from adjacent male detent elements 46, 48. Stacking aperture 58 is formed on toroidal planar surface 30 midway (i.e., separated by an angle of rotation of forty-five degrees as measured about rotational axis 200) between female detent element 54 and male detent element 48. Stacking aperture 60 is formed on toroidal planar surface 30 midway between male detent element 48 and female detent element 52. Likewise, stacking aperture 62 is formed on toroidal planar surface 30 midway between female detent element 52 and male detent element 46. Stacking aperture 64 is formed on toroidal planar surface 30 midway between male detent element 46 and male detent element 54. Stacking aperture 64 further includes open tape slot 70 which extends in communication to frustro-conical wall 28. Open tape slot 70 is used to secure an end of the flexible sheet media (not shown) to hub section 14.

Stacking apertures 58, 60, 62 and 64 are used to allow the male detent elements 46, 48 of an adjacent reel half 10 to pass therethrough without detent engagement in order to form a compact stacking configuration when several reel halves 10 are stacked by orienting the reel halves to face in the same direction, but are rotated forty five degrees with respect to adjacent reel halves (forty five degrees being the angle of rotation between the stacking apertures and adjacent detent elements).

Figure 4:
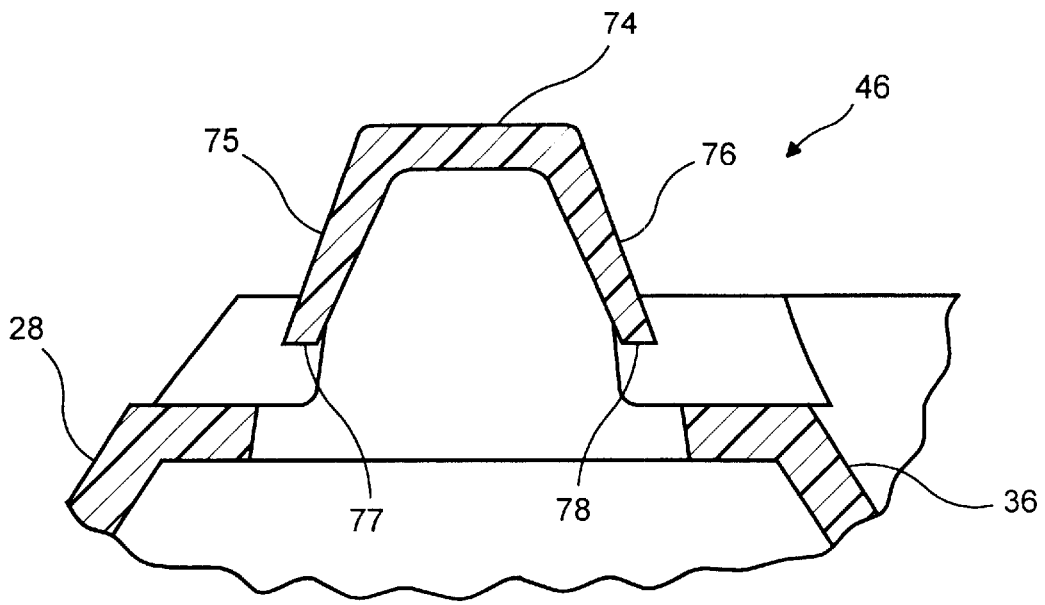
FIG. 4 is a detailed cross-sectional view of the male detent element along plane 2A—2A of FIG. 1, and further as indicated on FIG. 2 (rotated 180 degrees).
Figure 5:
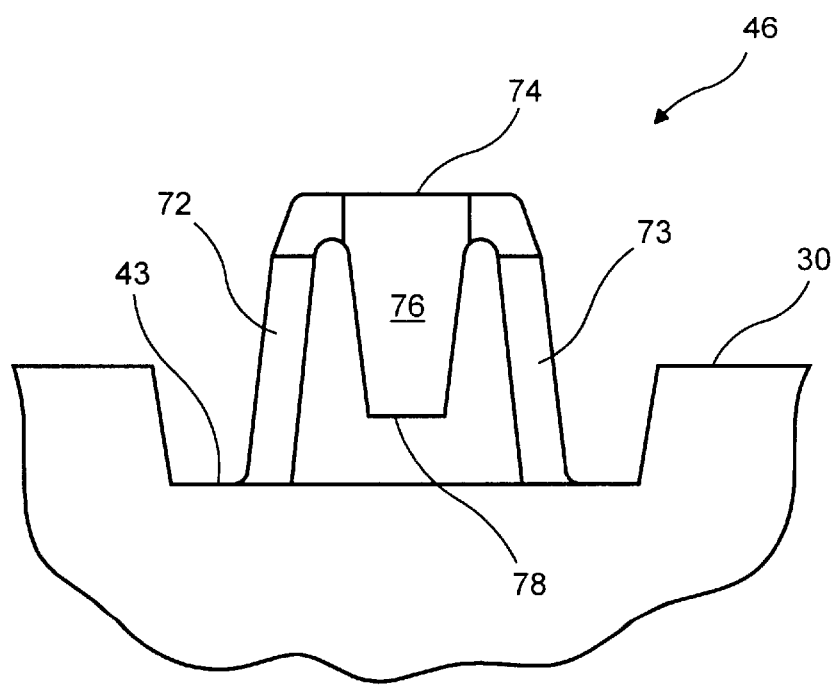
FIG. 5 is a detailed plan view of the male detent element as indicated on FIG. 2.

As shown in FIGS. 4 and 5, male detent element 46 arises from recessed surface 43 which, in the illustrated configuration, is lower in elevation than toroidal planar surface 30. Support walls 72, 73 are generally radially oriented and arise to upper surface 74. Detent wings 75, 76 are generally circumferentially oriented (that is, orthogonal to the radial orientation of support walls 72, 73) and extend downwardly from upper surface 74, and terminate in distal detent ends 77, 78, respectively. Male detent element 48 has corresponding elements.

Figure 6:
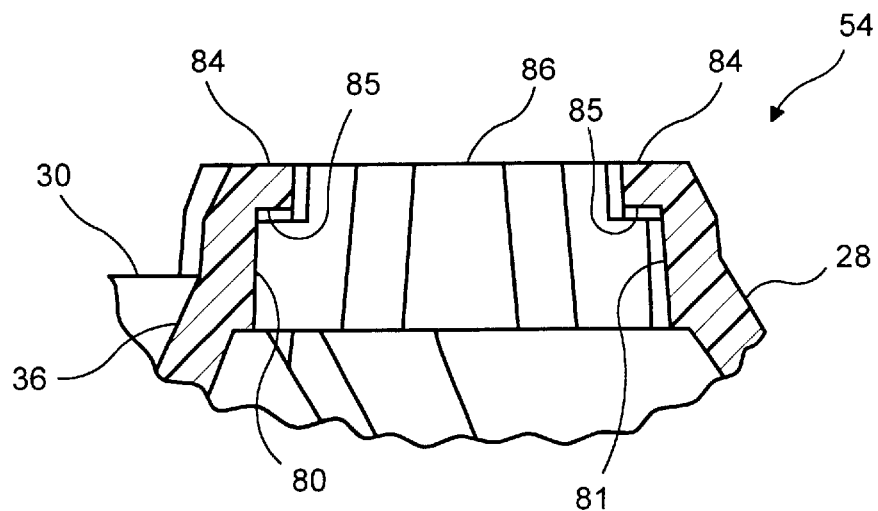
FIG. 6 is a detailed cross-sectional view of the female detent element along plane 2B—2B of FIG. 1, and further as indicated on FIG. 2.
Figure 7:
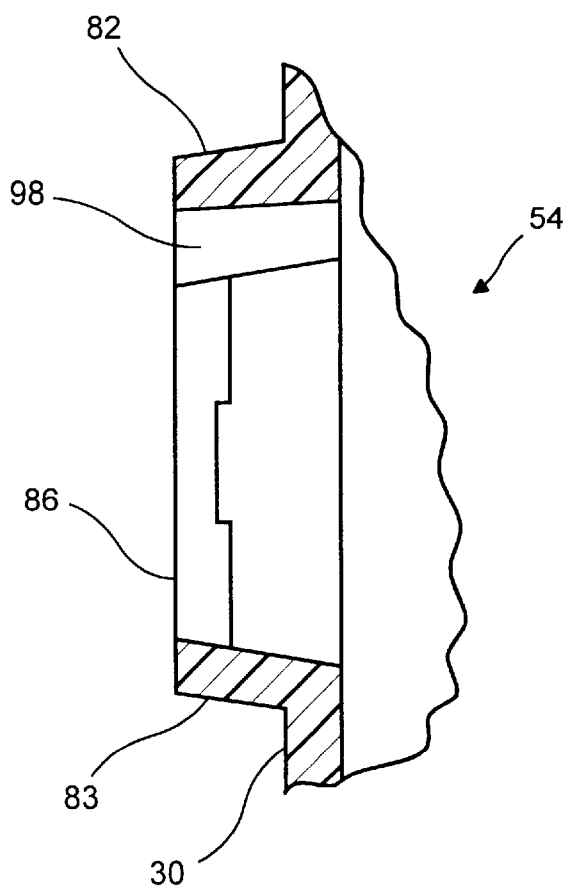
FIG. 7 is a cross-sectional view of the female element along plane 7—7 of FIG. 1.
Figure 8:
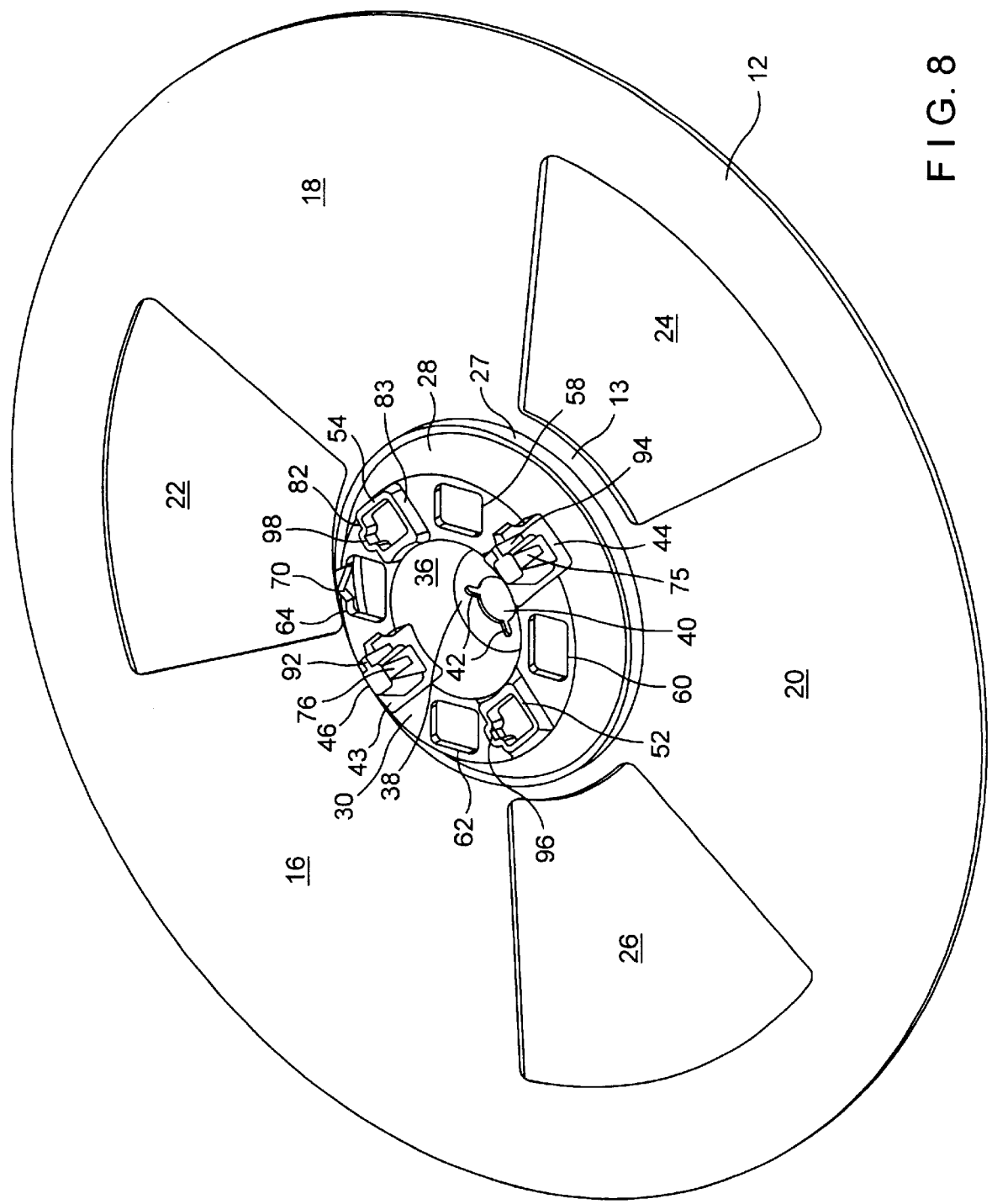
FIG. 8 is a perspective view of the reel half of the tape reel assembly of the present invention.

As shown in FIGS. 6 and 7, female detent element 54 includes circumferentially oriented walls 80, 81 and radially oriented tapered walls 82, 83 which arise from toroidal planar surface 30. Circumferentially oriented walls 80, 81 further include inwardly extending lip 84 thereby forming inverted ledge 85 around aperture 86. Walls 80, 81, 82, 83 arise from toroidal planar surface 30 by a distance substantially equal to the distance between toroidal planar surface 30 and recessed surfaces 43, 44. Female detent element 52 has corresponding elements.

In order to assure that the open tape slots 70 of both reel halves 10 align properly, the male detent elements 46, 48 have rotationally asymmetric ridges 92, 94 and female detent elements have rotationally asymmetric grooves 96, 98, respectively. In other words, ridge 92 is on the clockwise side (from the perspective of FIG. 1) of male detent element 46 while ridge 94 is on the counterclockwise side of male detent 48. Likewise, groove 96 is on the clockwise side of male detent element 52 while groove 98 is on the counterclockwise side of female detent element 54. This assures that when the two reel halves are joined as shown in FIGS. 2 and 3, male detent element 46 can be joined only with female detent element 54 and male detent element 48 can be joined only with female detent element 52 (noting that the "counterclockwise" grooves align with the "clockwise" ridges and vice versa when one reel half 10 is oriented to face another reel half 10). Again, this assures the proper alignment of the open tape slots 70 during assembly.

Prior to the assembly of the tape reel 100, the user typically receives reel halves 10 in a stacked configuration wherein all reel halves are facing the same direction, but rotated forty five degrees with respect to adjacent reel halves so that the male detent elements 46, 48 pass without detent engagement through two of the stacking apertures 58, 60, 62, 64 of an adjacent reel half. Thereafter, in order to assemble tape reel 100 to the configuration shown in FIG. 3, two reel halves 10 are aligned as shown in FIG. 2 so that male detent element 48 is inserted into female detent element 52 and male detent element 46 is inserted into female detent element 54. Improper alignment is prevented by rotationally asymmetric ridges 92, 94 and rotationally asymmetric grooves 96, 98. As male detent elements 46, 48 are urged through aperture 86 of female detent elements 54, 52, respectively, detent wings 75, 76 are urged inwardly until detent wings 75, 76 clear aperture 86. Detent wings 75, 76 then flex to an outward position so that distal detent ends 77, 78 engage inverted ledge 85 of inwardly extending lip 84, thereby achieving the engaged position shown in FIG. 3. In these engaged positions, the toroidal planar surfaces 30 of the two reel halves 10 abut each other. Similarly, the ends of walls 80, 81, 82, 83 of female detent elements 52, 54 abut recessed planar surfaces 44, 43 thereby adding to the strength of reel 100 and reducing the possibility of damage to detent elements 46, 48, 52, 54 in the event of differential rotational forces on the assembled reel halves. Aperture 40 is then placed around a drive spindle with circumferentially spaced radially extending grooves 42 engaged for secure rotational driving of reel 100. An end of the flexible sheet media (not shown) is then inserted into the open tape slot 70 and the flexible sheet media is wound about hub 14.

Subsequent disassembly of reel halves 10 from each other typically requires a tool (not shown) in the form of an aperture with walls to urge together detent wings 75, 76 so that male detent elements 46, 48 can be withdrawn from female detent elements 54, 52, respectively.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A tape reel assembly comprising:

a first reel half and a second reel half, each of said reel halves including:

a circular hub section formed about a rotational axis, said circular hub section including rotationally symmetrically placed male detent elements and rotationally symmetrically placed female detent elements, said male detent elements and said female detent elements include rotationally asymmetric components with said male detent elements and said female detent elements being oriented to receive detent elements of a complementary gender of the other of said reel halves along a line of motion parallel to said rotational axis;

whereby said male and female detent elements of said first reel half join respective said female and male detent elements of said second reel half such that said rotationally asymmetric components assure that for at least one of said male detent elements of said first half, only a preselected female element of said second reel half can be detent joined thereby;

wall portions extending radially from said hub section, said wall portions being longitudinally offset from said male and female detent elements by a hub wall, whereby a separation of said wall portions of said first reel half and said second reel half form a winding space outwardly concentric from said circular hub section;

wherein said female detent elements are apertures are formed between walls rising from a toroidal planar surface on said circular hub section and wherein said support walls of said male detent elements rise from planar surfaces recessed from said toroidal planar surface thereby adding to a strength of connection between said first and second reel halves and minimizing damage to said male and female detent elements.

2. The tape reel assembly of claim 1 wherein said female detent elements and said male detent elements are alternatingly circumferentially spaced about said circular hub section and wherein stacking apertures are formed rotationally midway between male and female detent elements, said stacking elements being sized whereby a plurality of reel halves can be oriented facing in a like direction, and rotated with respect to adjacent reel halves so that said male detent elements of an adjacent reel half can pass through said stacking apertures free of detent engagement.

3. The tape reel assembly of claim 2 wherein at least one of said stacking apertures includes a slot in communication with said hub wall, and said rotationally asymmetric elements are provided to assure that said slot of said first reel half aligns with a slot of said second reel half.

4. The tape reel assembly of claim 3 wherein said hub wall is frustro-conically shaped.

5. The tape reel assembly of claim 4 wherein said male detent elements include support walls longitudinally extending from said circular hub section and detent wings with a proximal end joined proximate to said support walls and terminating in a free distal end.

6. The tape reel assembly of claim 5 wherein said detent wings flex toward each other as said detent wings pass through said apertures of said female detent elements and thereafter flex outwardly to engage a lip of said apertures to form a detent engagement.

7. The tape reel assembly of claim 1 wherein said toroidal planar surface of said first reel half abuts said toroidal planar surface of said second reel half, and wherein said walls of said female detent elements rising from said planar toroidal engage said recessed surfaces of corresponding male detent elements.

8. The tape reel assembly of claim 7 wherein said first reel half is identical to said second reel half.

9. The tape reel assembly of claim 7 wherein said first reel half is identical to said second reel half but for a depth of said hub wall.

\* \* \* \* \*